(12) United States Patent
Marr et al.

(10) Patent No.: US 7,451,296 B2
(45) Date of Patent: *Nov. 11, 2008

(54) METHOD AND APPARATUS FOR PAUSING EXECUTION IN A PROCESSOR OR THE LIKE

(75) Inventors: Deborah T. Marr, Portland, OR (US); Dion Rodgers, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/728,962

(22) Filed: Dec. 8, 2003

(65) Prior Publication Data

US 2004/0117604 A1    Jun. 17, 2004

Related U.S. Application Data

(63) Continuation of application No. 09/489,130, filed on Jan. 21, 2000, now Pat. No. 6,671,795.

(51) Int. Cl.
*G06F 7/38* (2006.01)
(52) U.S. Cl. .................. 712/220; 712/228; 712/244
(58) Field of Classification Search ............ 712/220, 712/228, 244; 709/107
See application file for complete search history.

(56) References Cited

U.S. PATENT DOCUMENTS

| | | | |
|---|---|---|---|
| 4,881,194 | A | 11/1989 | Sprague et al. |
| 5,355,457 | A | 10/1994 | Shebanow et al. |
| 5,357,617 | A | 10/1994 | Davis et al. |
| 5,524,247 | A | 6/1996 | Mizuno |
| 5,530,597 | A | 6/1996 | Bowles et al. |
| 5,546,593 | A | 8/1996 | Kimura et al. |
| 5,584,031 | A | 12/1996 | Burch et al. |

(Continued)

FOREIGN PATENT DOCUMENTS

EP    0655673    5/1995

(Continued)

OTHER PUBLICATIONS

"EP 1522917 Search Report", (Oct. 18, 2007), 2 pages.

(Continued)

*Primary Examiner*—Alford Kindred
*Assistant Examiner*—Chun-Kuan Lee
(74) *Attorney, Agent, or Firm*—Blakely, Sokoloff, Taylor & Zafman LLP

(57) ABSTRACT

A method and apparatus for pausing execution of instructions from a thread is described. In one embodiment, a pause instruction is implemented as two instructions or microinstructions: a SET instruction and a READ instruction. When a SET flag is retrieved for a given thread, the SET instruction sets a Bit flag in memory indicating that execution for the thread has been paused. The SET instruction is placed in the pipeline for execution. The following READ instruction for that thread, however, is prevented from entering the pipeline until, the SET instruction is executed and retired (resulting in a clearing of the Bit flag). Once the Bit flag has been cleared, the READ instruction is placed in the pipeline for execution. During the time that processing of one thread is paused, the execution of other threads may continue.

17 Claims, 4 Drawing Sheets

U.S. PATENT DOCUMENTS

| | | | |
|---|---|---|---|
| 5,632,032 | A | 5/1997 | Ault et al. |
| 5,748,950 | A | 5/1998 | White et al. |
| 5,761,522 | A | 6/1998 | Hisanaga et al. |
| 5,784,616 | A | 7/1998 | Horvitz |
| 5,835,705 | A | 11/1998 | Larsen et al. |
| 5,872,963 | A | 2/1999 | Bitar et al. |
| 5,933,627 | A | 8/1999 | Parady |
| 5,961,584 | A | 10/1999 | Wolf |
| 5,961,639 | A | 10/1999 | Mallick et al. |
| 6,076,157 | A * | 6/2000 | Borkenhagen et al. ...... 712/228 |
| 6,216,220 | B1 | 4/2001 | Hwang |
| 6,493,741 | B1 * | 12/2002 | Emer et al. ................. 718/107 |
| 6,496,925 | B1 | 12/2002 | Rodgers et al. |
| 6,535,905 | B1 | 3/2003 | Kalafatis et al. |
| 6,542,921 | B1 | 4/2003 | Sager |
| 6,671,795 | B1 | 12/2003 | Marr et al. |
| 6,687,838 | B2 | 2/2004 | Orenstien et al. |
| 6,857,064 | B2 | 2/2005 | Smith et al. |
| 6,889,319 | B1 | 5/2005 | Rodgers et al. |

FOREIGN PATENT DOCUMENTS

| | | |
|---|---|---|
| EP | 0827071 | 3/1998 |
| JP | 59111526 | 10/1984 |
| WO | WO-9708608 | 3/1997 |

OTHER PUBLICATIONS

McCrackin, D. C., "Eliminating interlocks in deeply piplelined processors by delay enforced multistreaming", *IEEE Transactions on Computers*, vol. 40; Issue 10, Digital Object Identifier 10/1109/12.93745, (Oct. 1991), pp. 1125-1132.

Advanced Micro Devices, Inc., "AMD-3D Technology Manual", (Feb. 1998), pp. i-x, 1-58.

Barad, Haim, et al., "Intel's Multimedia Architecture Extension", *Nineteenth Convention of Electrical and Electronics Engineers in Israel*, (1996), pp. 148-151.

Control Data Corporation, "Control Data 6400/6500/6600 Computer Systems Reference Manual", Pub. No. 60100000, (1967), 159 pages.

Convex Computer Corporation, "C4/XA Architecture Overview", *Convex Technical Marketing*, (Feb. 1994), 279 pages.

Intel Corporation, "i860 Microprocessor Family Programmer's Reference Manual", (1992), Ch. 1, 3, 8 & 12.

Intel Corporation, "Intel 80386 Programmer's Reference Manual", (1986), 421 pages.

Intel Corporation, "Pentium Processor User's Manual", vol. 3: *Architecture and Programming Manual*, (1993), Ch. 1, 3-4, 6, 8 & 18.

Kohn, L., et al., "The Visual Instruction Set (VIS) in UltraSPARC", *SPARC Technology Business—Sun Microsystems, Inc.*, (1995), pp. 462-469.

Lawrence Livermore Laboratory, "S-1 Uniprocessor Architecture", (Apr. 21, 1983), 386 pages.

Lawrence Livermore Laboratory, "vol. I: Architecture—The 1979 Annual Report—The S-1 Project", (1979), 443 pages.

Lawrence Livermore Laboratory, "vol. II: Hardware—The 1979 Annual Report—The S-1 Project", (1979), 366 pages.

Motorola, Inc., "MC88110 Second Generation RISC Microprocessor User's Manual", MC8110UM/AD, (1991), 619 pages.

Philips Electronics, "TriMedia TM1000 Preliminary Data Book", (1997), 496 pages.

Samsung Electronics, "21164 Alpha Microprocessor Data Sheet", (1997), 121 pages.

Shipnes, J., "Graphics Processing with the 88110 RISC Microprocessor", *IEEE*, (1992), pp. 169-174.

Sun Microsystems, Inc., "VIS Visual Instruction Set User's Manual", Part #805-1394-01, (Jul. 1997), pp. i-xii, 1-136.

Sun Microsystems, Inc., "Visual Instruction Set (VIS) User's Guide", *Vesion 1.1*, (Mar. 1997), pp. i-xii, 1-127.

Texas Instruments, "TMS320C2X User's Guide", (1993), pp. 3:2-3:11; 3:28-3:34; 4:1-4:22; 4:41; 4:103; 4:119-4:120; 4:122; 4:150-4:151.

Texas Instruments, "TMS320C80 (MVP) Master Processor User's Guide", (1995), 595 pages.

Texas Instruments, "TMS320C80 (MVP) Parallel Processor User's Guide", (1995), 705 pages.

"PCT International Search Report", PCT/US01/01392, (May 28, 2001), 5 pgs.

* cited by examiner

METHOD AND APPARATUS FOR PAUSING EXECUTION IN A PROCESSOR OR THE LIKE

This application is a continuation of U.S. patent application Ser. No. 09/489,130, filed Jan. 21, 2000, now U.S. Pat. No. 6,671,795.

FIELD OF THE INVENTION

The present invention pertains to a method and apparatus for pausing execution in a processor or the like. More particularly, an embodiment of the present invention pertains to controlling the pausing of execution of one of a plurality of threads so as to give preference to another of the threads or to save power.

BACKGROUND OF THE INVENTION

As is known in the art, a processor includes a variety of sub-modules, each adapted to carry out specific tasks. In one known processor, these sub-modules include the following: an instruction cache, an instruction fetch unit for fetching appropriate instructions from the instruction cache; decode logic that decodes the instruction into a final or intermediate format, microoperation logic that converts intermediate instructions into a final format for execution; and an execution unit that executes final format instructions (either from the decode logic in some examples or from the microoperation logic in others).

Under operation of a clock, the execution unit of the processor system executes successive instructions that are presented to it. As is known in the art, an instruction may be provided to the execution unit which results in no significant task performance for the processor system. For example, in the Intel® X86 processor systems, a NOP (No Operation) instruction causes the execution unit to take no action for an "instruction cycle." An instruction cycle as used herein is a set number of processor clock cycles that are needed for the processor to execute an instruction. In effect, the NOP instruction stalls the processor for one instruction cycle.

A limitation of the NOP instruction is that it stalls the processor for a set unit of time. Thus, using one or more NOP instructions, the processor can only be stalled for an amount of time equal to a whole number multiple of instruction cycles.

Another limitation of the NOP instruction is that the execution unit of the processor is unable to perform any other instruction execution. For example, instructions to be executed by the execution unit may be divided into two or more "threads." Each thread is a set of instructions to achieve a given task. Thus, if one of the threads includes a NOP instruction, this instruction is executed by the execution unit and stalls the entire processor (i.e., execution of the other thread cannot be done during the execution of the NOP instruction).

In view of the above, there is a need for an improved method and apparatus for pausing processor execution that avoids these limitations.

SUMMARY OF THE INVENTION

According to an embodiment of the present invention, a method of pausing execution of instructions in a thread is presented. First it is determined if a next instruction for a first thread is an instruction of a first type. If it is then instruction of the first thread are prevented from being processed for execution while instruction from a second thread can be processed for execution.

BRIEF DESCRIPTIONS OF THE DRAWINGS

DETAILED DESCRIPTION

Figure 1:
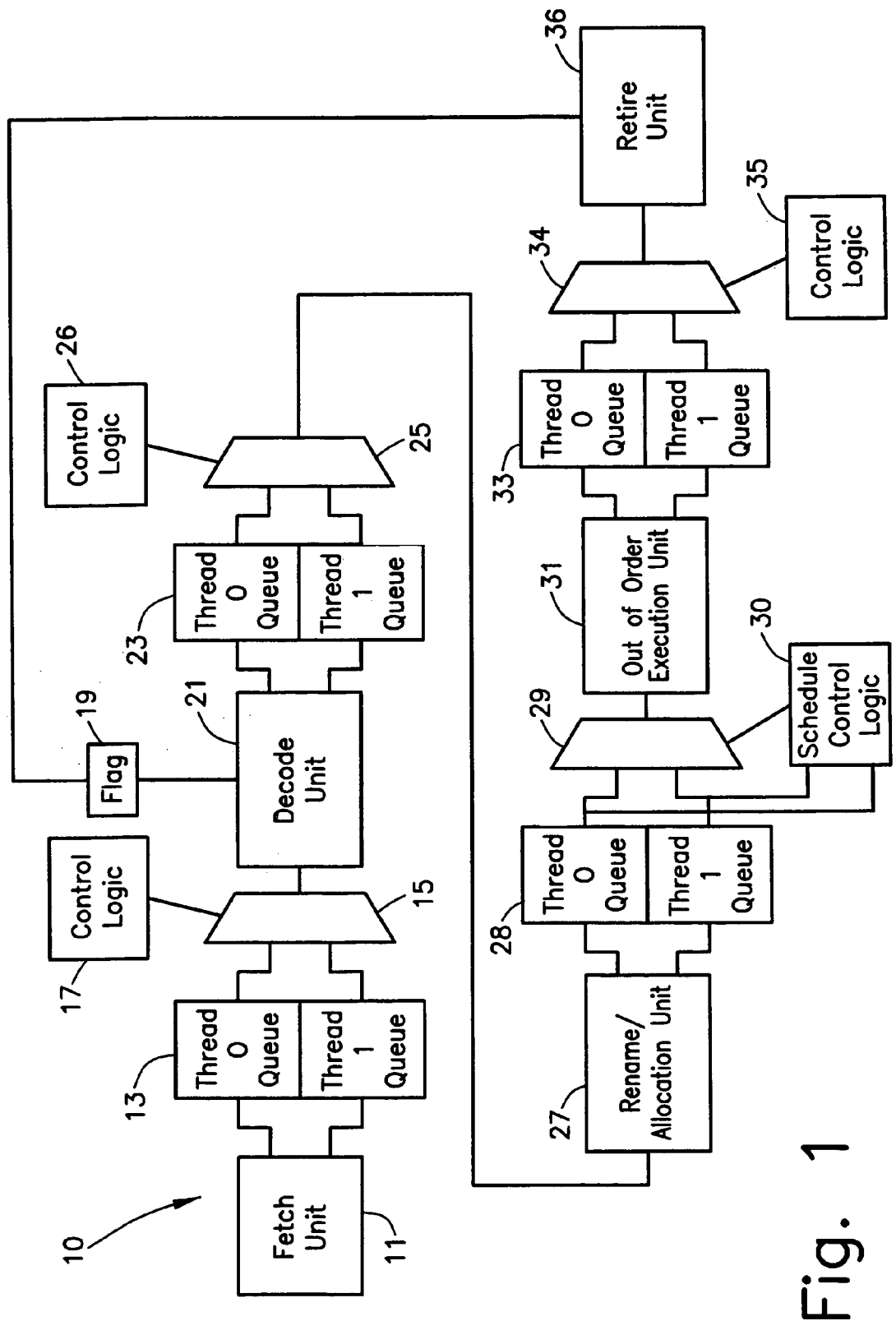
FIG. 1 is a block diagram of a portion of a processor employing an embodiment of the present invention.

Referring to FIG. 1, an example of a portion of a processor system 10 employing an embodiment of the present invention is shown. In this embodiment, the processor is a multi-threaded processor where the execution is theoretically divided into two or more logical processors. As used herein, the term "thread" refers to an instruction code sequence. For example, in a video phone application, the processor may be called upon to execute code to handle video image data as well as audio data. There may be separate code sequences whose execution is designed to handle each of these data types. Thus, a first thread may include instructions for video image data processing and a second thread may be instructions for audio data processing. In this example, there is a single execution unit (out of order execution unit 31), which may execute one instruction at a time. The processor system 10, however, may be treated as two logical processors, a first logical processor executing instructions from the first thread (Thread 0) and a second logical processor executing instructions from the second thread (Thread 1).

In this embodiment of the processor system 10, instructions are fetched by a fetch unit 11 and supplied to a queue 13 and stored as part of the thread 0 queue or the thread 1 queue. One skilled in the art will appreciate that the queues used in processor system 10 may be used to store more than two threads. Instructions from the two threads are supplied to a mulitplexer (MUX) 15, and control logic 17 is used to control whether instructions from thread 0 or thread 1 are supplied to a decode unit 21. Decode unit 21 may convert an instruction into two or more microinstructions and supplies the instructions to queue 23. The outputs of queue 23 are supplied to a MUX which supplies instruction from thread 0 or thread 1 to a rename/allocation unit 27 based on operation of control logic 26. The rename/allocation unit 27, in turn, supplies instructions to queue 28. MUX 29 selects between the thread 0 queue and the thread 1 queue based on the operation of schedule control logic 30, which also receives the same inputs as MUX 29. The output of MUX 29 is supplied to an execution unit 31 which executes the instruction. The instruction is then placed in queue 33. The outputs of queue 33 are supplied to a MUX 34 which sends instruction from thread 0 and thread 1 to a retire unit 36 based on the operation of control logic 35.

According to a first embodiment of the present invention, a pause instruction is used to suspend processing of instructions from a thread. In FIG. 1, the pause instruction is fetched by fetch unit 11 and stored in the thread 0 queue, in this example. The output of the thread 0 queue is supplied via MUX 15 to decode unit 21 which decodes the pause instruction into two microinstructions: a SET instruction and a READ instruction. At the decode unit 21, a SET instruction causes a value to be stored in memory (e.g., a bit flag 19) indicating that a SET instruction has been received for a particular thread (thread 0 in this example). The SET instruction is then fed into the "pipeline" which includes rename/allocation unit 27 and execution unit 31 and the associated queues in this embodiment. Execution unit 31 takes no action on the SET instruction (i.e., treats it as the known NOP instruction). Once the SET instruction is retired by retire unit 26, the flag 19 is reset.

The READ instruction at decode unit 21 is not placed into the pipeline until the flag 19 for that flag is reset. Accordingly, if there are instructions from thread 1 in queue 13, these instructions can be decoded by decode unit 21 and placed into the pipeline. Thus, depending on the number of thread 1 instructions in queues 23, 28 and 33, will affect how long the execution of thread 0 is paused (i.e., the greater number of thread 1 instructions in the pipeline, the longer it will take the SET instruction to reach retire unit 36). Once the flag 19 is reset, the READ instruction is sent to queue 23 and is eventually sent to execution unit 31. As with the SET instruction, execution unit takes not action as with a NOP instruction. In this embodiment of the present invention, decode unit 21 alternates decoding of instructions from thread 0 and thread 1. After a SET instruction for thread 0, for example, the decode alternates between decoding instructions from thread 1 and checking the value of flag 19 until it is reset.

Figure 2:
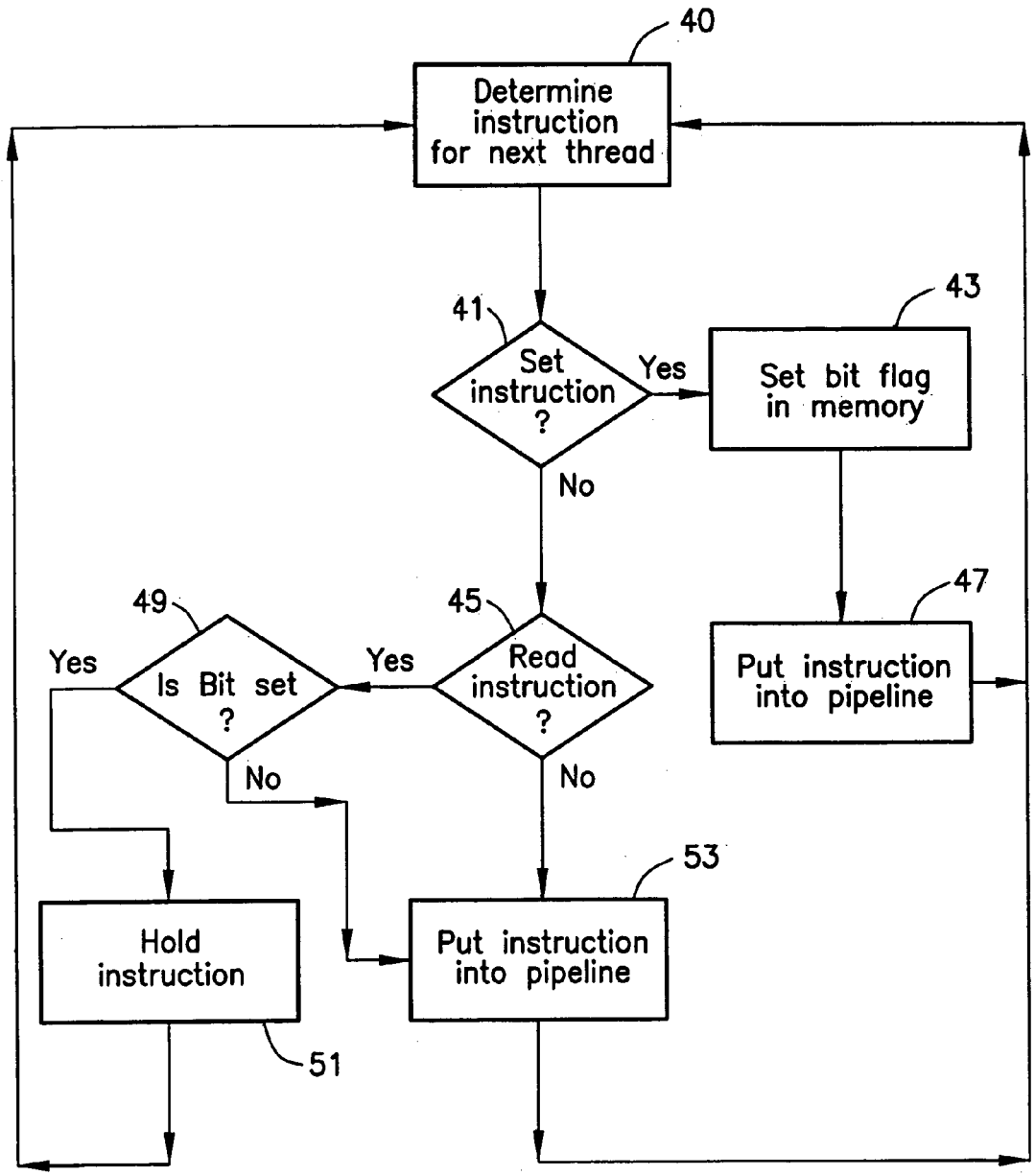
FIG. 2 is a flow diagram showing an embodiment of a method according to an embodiment of the present invention.

An example of the operation of decode unit 21 in this embodiment is shown in FIG. 2. After decoding, in block 40, the instruction from the next thread is determined. In decision block 41, it is determined whether the instruction is a SET instruction. If it is, then control passes to block 43 where the bit flag in memory is set. In block 47, the SET instruction is placed into the pipeline for the execution unit. Control then returns to block 40 to determine the next instruction from the next thread. If the instruction is not a SET instruction, control passes to decision block 45 to determine if the instruction is a READ instruction. If it is, then control passes to decision block 49 to determine if the appropriate bit flag in memory is set. If the bit flag in memory is set, then control passes to block 51 where the instruction is held back from the pipeline (thus, temporarily blocking execution of instructions from that particular thread). Control then shifts to block 40 to determine the next instruction from the next thread. If the bit flag is not set (decision block 49), then control passes to block 53 where the instruction (in this case the READ instruction) is placed into the pipeline for execution. As stated above, the bit flag is reset in this embodiment when the SET instruction is retired. Control then returns to block 40 to determine the next instruction from the next thread. Likewise, if the instruction is neither a SET instruction nor a READ instruction, it is placed into the pipeline for execution in a normal manner.

As seen from the above, the SET instruction works to effect a pause in execution for that thread until the instruction is retired. This is because the following READ instruction is not placed into the pipeline until the SET instruction is retired effectively blocking execution of the following instructions from that thread. During the pause of one thread, instructions from that thread are prevented from being processed for execution (e.g., placed into the pipeline, sent to the execution unit, etc.) while instructions from another thread can be processed for execution. When execution of a thread is paused, overall power consumption for the processing system may be reduced.

Figure 3:
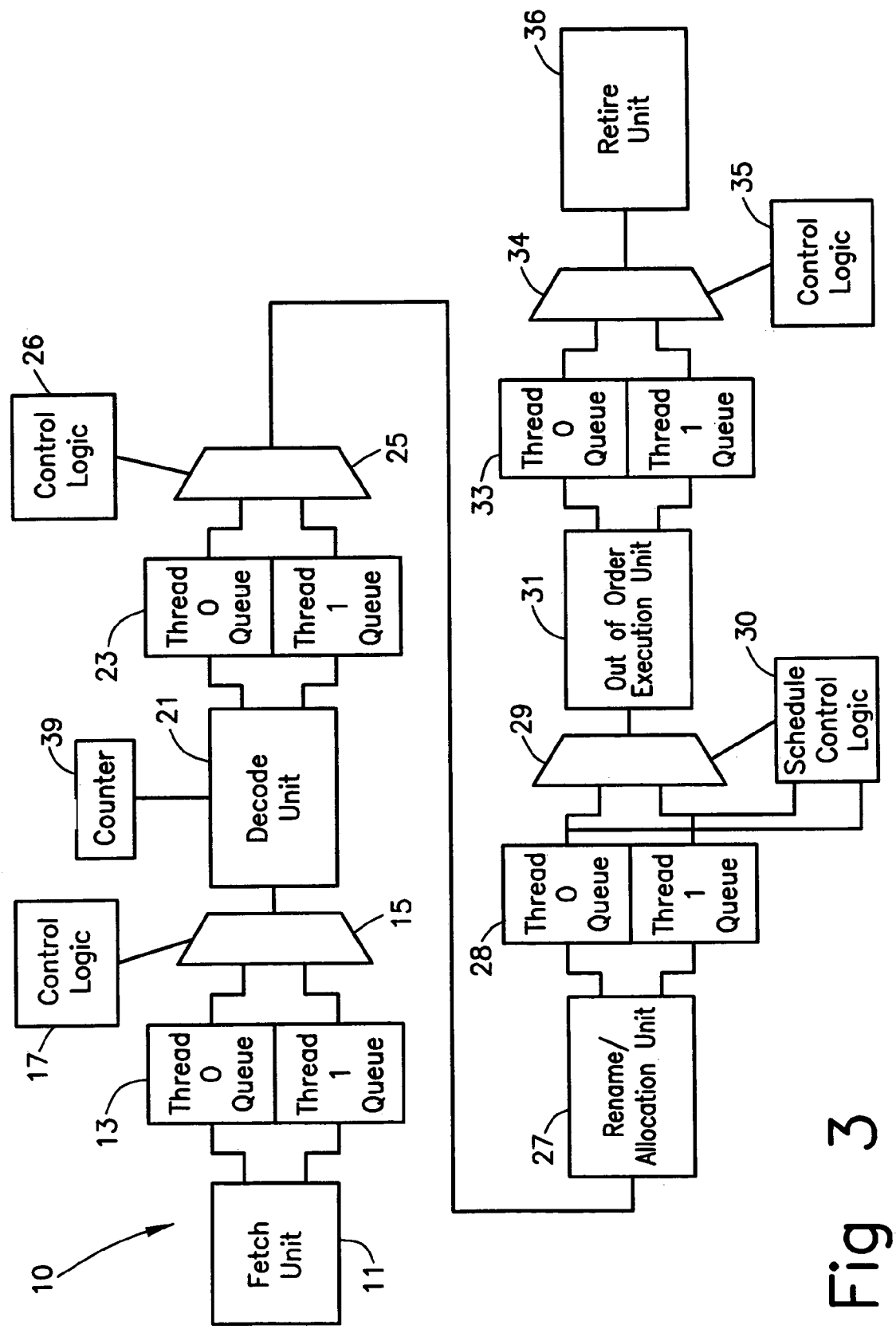
FIG. 3 is a block diagram of a portion of a processor employing an additional embodiment of the present invention.

According to another embodiment of the present invention, a pause instruction is implemented with a timer or counter. As shown in FIG. 3, the memory flag 19 of FIG. 1 is replaced by a counter 39. As a first example, when decode unit 21 determines that the next instruction from a first thread is a pause instruction (i.e., an instruction having a particular bit format), then a predetermined value is loaded into counter 39. In this example, counter 39 counts down from the predetermined value to zero. While counter 39 counts down to zero, instructions from the second thread (e.g., thread 1) are decoded and loaded into the pipeline. In this example, decode unit 21 alternates between checking the value of counter 39 (instead of decoding instructions from thread 0) and decoding instructions from thread 1. Once the counter has finished (e.g., reached zero), the next instruction from that thread can be loaded into the pipeline. As a second example, the pause instruction will include an operand (i.e., a value to be loaded into the timer). Accordingly, this allows decode unit 21 to load the operand value into counter 39 so that the length of time for the pause instruction can be set.

Figure 4:
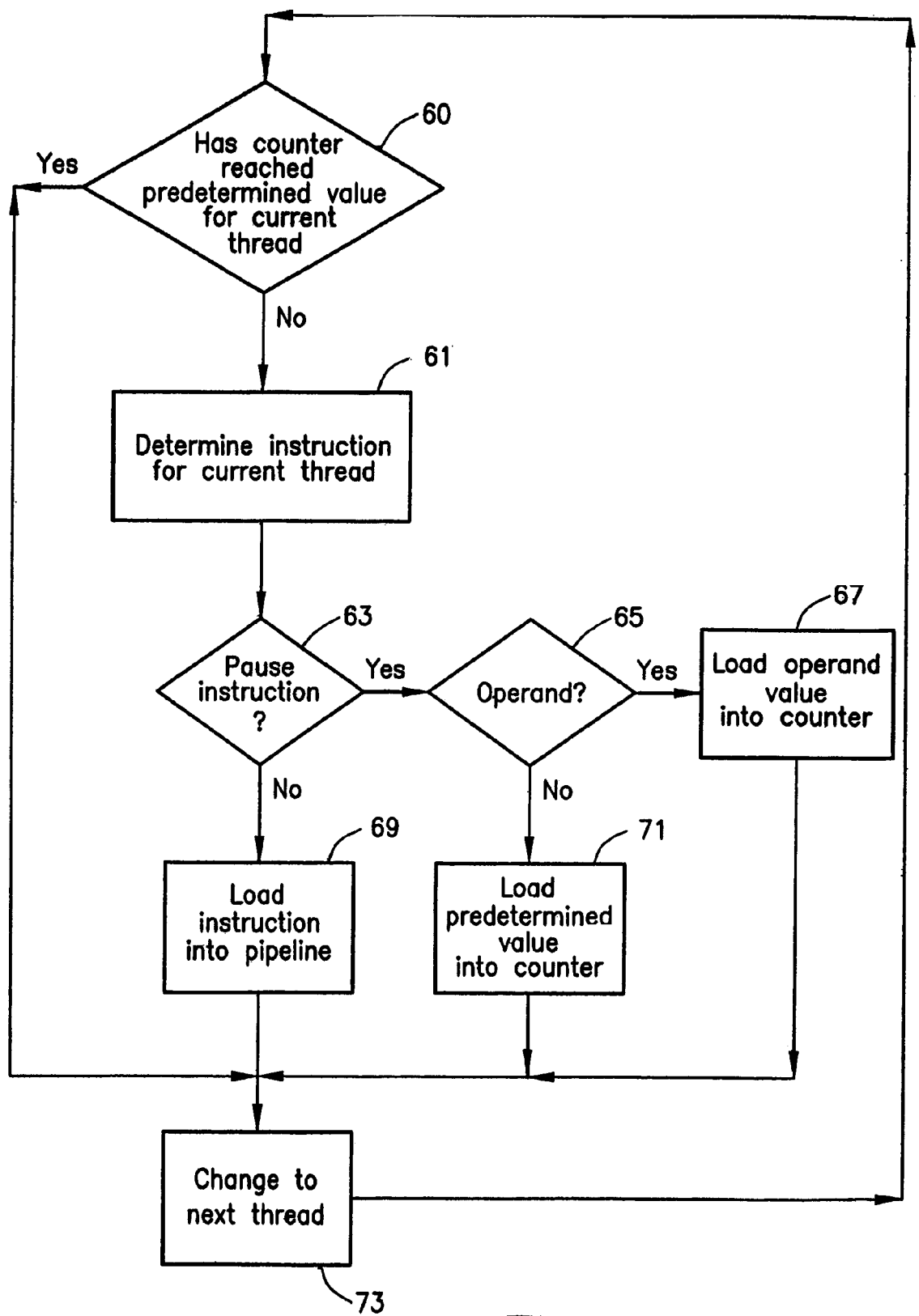
FIG. 4 is a flow diagram showing an additional embodiment of a method according to an embodiment of the present invention.

An example of the operation of the processing system of FIG. 3 is shown in FIG. 4. In decision block 60 it is determined if the counter has reached a predetermined value for the current thread. If no counter has been set or if the value has reached the predetermined value (e.g., zero), then control passes to block 61 to determine the next instruction for the current thread. If this instruction is a pause instruction (decision block 63), then control passes to decision block 65 to determine whether an operand is associated with the pause instruction. If an operand is associated with the pause instruction, then control passes to block 67 to load the value into the counter (control then passes to block 73 to change to the next thread). If an operand is not associated with the pause instruction, then control passes to block 65 to load a predetermined value into the counter (again control then passes to block 73 to change to the next thread). If in decision block 63, the instruction is not a pause instruction, then control passes to block 71 to load the instruction into the pipeline.

According to an embodiment of the present invention, the use of the pause instruction can be an indication by the operating system that the processing system hardware can go into a low-power mode. Thus, execution of operating system code (or any other software code) at the processor system may cause a pause instruction to be forward to the decode unit. As described above, pausing execution of a thread may lead to a decrease in overall power consumption. In response to decoding a pause instruction, the processing system 10 may take other steps to lower overall power consumption further as desired.

Although several embodiments are specifically illustrated and described herein, it will be appreciated that modifications and variations of the present invention are covered by the above teachings and within the purview of the appended claims without departing from the spirit and intended scope of the invention.

What is claimed is:

1. A method comprising:
   determining whether an instruction for a first thread is of a first type;
   pausing execution of instructions of the first thread upon determining that the instruction is of the first type while executing instructions from a second thread; and
   resuming execution of a second microinstruction decoded from the instruction after retirement of a first microinstruction decoded from the instruction.

2. The method of claim 1 further comprising decoding the instruction into the first microinstruction and the second microinstruction.

3. The method of claim 2 wherein the first microinstruction causes a value to be stored in memory for the first thread.

4. The method of claim 3 further comprising:
processing the second microinstruction for execution when the value stored in the memory is reset.

5. The method of claim 4 wherein the value stored in memory is reset when the first microinstruction is retired.

6. A method comprising:
determining whether an instruction of a first thread is of a first type;
initiating a counter upon determining that the instruction of the first thread is of the first type, wherein the instruction of the first thread includes an operand and the initiating includes loading the counter with a value of the operand; and
pausing execution of instructions of the first thread until the counter reaches the value of the operand while executing instructions of a second thread at a pipeline stage.

7. The method of claim 6 further comprising resuming executing instructions of the first thread after the counter reaches the value of the operand.

8. An apparatus, comprising:
a decode unit to determine whether an instruction of a first thread is of a first type, said decode unit to pause execution of instructions of said first thread upon determining that the instruction of the first thread is of the first type by generating a first microinstruction to cause a value to be stored in a memory for the first thread while instructions from a second thread can be executed, said decode unit further to generate a second microinstruction upon which execution is to resume after retirement of the first microinstruction.

9. The apparatus of claim 8 wherein the decode unit is to allow the second microinstruction to be executed when the value stored in the memory is reset.

10. The apparatus of claim 9 further comprising:
a retire unit coupled to the decode unit, wherein the retire unit is to cause the value stored in the memory to be reset when the first microinstruction is retired by the retire unit.

11. The apparatus of claim 8, implemented in a system including operating system code to cause the instruction to be forward to the decode unit.

12. An apparatus comprising:
a decode unit to determine whether a first instruction for a first thread is of a first type;
a counter coupled to the decode unit, the counter to be loaded with a value of an operand of the first instruction if the first instruction for the first thread is of the first type, the decode unit to pause executing instructions of the first thread until the counter reaches the value of the operand; and
wherein instructions for a second thread can be executed while the instructions of the first thread are paused from being executed.

13. The apparatus of claim 12 wherein the decode unit is to operate while the first thread is paused from being executed.

14. The apparatus of claim 12, implemented in a system including operating system code to cause the first instruction to be forward to the decode unit.

15. An apparatus comprising:
a queue; and
a decode unit coupled with the queue to receive and decode a pause instruction of a first thread, the decode unit in response to the pause instruction to pause execution of instructions of the first thread for a period of time while instructions from a second thread are executed and the decode unit in response to the pause instruction to generate a microinstruction that is to be queued in the queue during the period of time, and the decode unit further to cause resumption of execution of instructions of the first thread after the period of time.

16. An apparatus comprising:
a decode unit to receive and decode a pause instruction of a first thread, the decode unit in response to the pause instruction to pause execution of instructions of the first thread while instructions from a second thread are executed by generating a first instruction and a second instruction, the first instruction to set a flag before being forwarded to an execution unit and the second instruction to prevent the instructions of the first thread from being executed until after the flag has been reset after retirement of the first instruction.

17. A pause instruction stored in one of a memory and a queue that is operable to cause a processor to perform operations comprising:
decoding the pause instruction;
loading a value of an operand of the pause instruction into a counter;
pausing execution of instructions of a first thread from which the pause instruction was received while instructions of a second thread are executed until the counter reaches the value of the operand; and
resuming execution of instructions of the first thread after the counter reaches the value of the operand.

* * * * *